United States Patent [19]

Takeshima et al.

[11] Patent Number: 4,908,926
[45] Date of Patent: Mar. 20, 1990

[54] METHOD OF AND APPARATUS FOR CONTROLLING NUT RUNNER

[75] Inventors: Akira Takeshima; Toshikazu Asakura; Akihiko Takahashi; Shigeo Kobayashi; Shoichi Hayashi, all of Sayama, Japan

[73] Assignee: Honda Giken Kogyo Kabushiki Kaisha, Tokyo, Japan

[21] Appl. No.: 288,248

[22] Filed: Dec. 22, 1988

[30] Foreign Application Priority Data

Dec. 23, 1987 [JP] Japan ................................. 62-323876

[51] Int. Cl.⁴ ............................................. B23Q 17/00
[52] U.S. Cl. ....................................... 29/407; 29/446; 81/469; 173/12
[58] Field of Search ................. 29/407, 428, 446, 240; 81/469; 173/1, 12

[56] References Cited

U.S. PATENT DOCUMENTS 2,720,803 10/1955 Rice et al. .
3,827,506 8/1974 Himmelstein et al. .
3,965,778 6/1976 Aspers et al. .
4,095,325 6/1978 Hashimoto et al. ................ 29/407
4,413,396 11/1983 Wallace et al. ..................... 29/407
4,791,838 12/1988 Bickford et al. ................ 81/469 X

FOREIGN PATENT DOCUMENTS 533840 3/1971 Japan .

Primary Examiner—Joseph M. Gorski

[57] ABSTRACT

The output shaft of a nut runner for tightening a fastener such as a bolt is first rotated with a first torque at a first speed. When the tightening torque of the output shaft reaches a preset switching torque, the first torque first speed rotation of the output shaft is interrupted, and thereafter the output shaft is rotated with a second torque at a second speed. When the tightening torque then reaches a preset snug torque, the second torque second speed rotation of the output shaft is interrupted, and thereafter the output shaft is rotated with a third torque at a third speed. When the tightening torque reaches a preset final torque, the third torque third speed rotation of the output shaft is stopped, thus completing the tightening of the fastener.

5 Claims, 4 Drawing Sheets

4,908,926

METHOD OF AND APPARATUS FOR CONTROLLING NUT RUNNER

BACKGROUND OF THE INVENTION

1. Field of the Invention

The present invention relates to a method of and an apparatus for controlling a nut runner which tighten a fastener such as a bolt, a nut, or the like by reducing step-wise the rotational speed of the output shaft of the nut runner.

2. Description of the Background

Nut runners are employed to tighten fasteners such as bolts, nuts, or the like. When tightening such a fastener with a nut runner, in order to reduce the time required to tighten the fastener, the fastener is first tightened with a low torque and at a high speed until the tightening torque reaches a prescribed level from the start of tightening the fastener. Then, when the prescribed torque level is reached, the fastener is tightened with a higher torque at a low speed. Such a two-stage tightening process is performed by rotating the output shaft of the nut runner first at a higher speed and then at a lower speed.

One known fastener tightening process of the above type is disclosed in Japanese Patent Publication No. 53-3840, for example. In the disclosed process, the fastener is tightened at a high speed by a nut runner driven by a DC motor until a prescribed torque level is reached.

The current supplied to the DC motor and the torque produced by the DC motor are proportional to each other. Therefore, the torque of the DC motor can be detected by detecting the value of the current supplied thereto. When the torque thus detected of the nut runner output shaft reaches a certain switching torque level, the power supply that energizes the DC motor is switched from a higher-voltage unit to a lower-voltage unit to lower the voltage applied to the DC motor, thereby rotating the nut runner output shaft at a lower speed. When the torque of the nut runner output torque, as detected by a separate torque sensor, reaches a prescribed tightening torque level, the DC motor is de-energized completing the tightening process.

In the above tightening process, the rotational speed of the motor is switched from a higher speed to a lower speed immediately before the fastener, such as a bolt, is seated on a surface. Since the tightening torque of the output shaft increases abruptly just before the fastener is seated, however, the rotational speed of the motor may not appropriately be switched from the higher speed to the lower speed on account of an error in the motor current measured for torque detection, a fluctuation in the rotational speed of the motor, a delay in the response to the switching between the motor speeds, an inertial force of a rotating member such as the output shaft, and other factors. If the motor speed is switched from the higher speed to the lower speed after the fastener is seated, then the tightening torque is increased in excess of the desired torque level due to the response delay in the switching from the higher to the lower speed. Particularly, inasmuch as the fastener has been tightened at a high speed immediately before it is seated, the inertial force of the output shaft is large, and the fastener tends to be excessively tightened due to such large inertial force even after a switching signal to change the motor speed from the higher speed to the lower speed is issued. Such a switching signal may be applied earlier to change the motor speed from the higher speed to the lower speed in order to avoid an excessive tightening of the fastener. Then, the motor speed may be switched to the lower speed too early because of a measured motor current, a motor speed fluctuation, or the like, with the result that the fastener may be tightened at the lower speed for a certain period of time before it is seated, and the total tightening time required may be prolonged.

To prevent the above problems, it is necessary to lower the rotational speed of the nut runner output shaft to reduce the inertial force thereof when the rotational speed is high. Typically, the rotational speed of the output shaft is reduced to about 300 rpm. Therefore, efforts to reduce the total tightening time are limited.

U.S. Pat. No. 3,965,778 discloses a procedure for reliably switching the rotational speed of the output shaft of a nut runner from a higher speed to a lower speed. According to the disclosed process, when a prescribed tightening torque is detected at a snug point immediately before a bolt or the like is seated on a surface, the motor is de-energized to stop the rotation of the output shaft so as to maintain an output shaft torque corresponding to a fastener seating torque.

However, since a torque increase from the tightening torque at the snug point to a final tightening torque is extremely abrupt, a certain response delay may nevertheless occur and the fastener may still be excessively tightened when the output shaft is stopped at the final tightening torque level.

SUMMARY OF THE INVENTION

It is an object of the present invention to provide a method of and an apparatus for controlling a nut runner by detecting a tightening torque of the output shaft of the nut runner, switching the rotational speed of the output shaft between three speed stages, i.e., higher, or predetermined speed medium, and lower speeds or first, second, and third speeds, temporarily stopping the output shaft upon speed switching to eliminate adverse effects of a response delay and an inertial force of the output shaft, and increasing the higher rotational speed to shorten a time required to tighten a fastener.

To achieve the above object, there is provided a method of controlling a nut runner for tightening a fastener, including the following steps of: rotating an output shaft of the nut runner with a lower predetermined torque at a higher, predetermined speed; detecting a tightening torque of the output shaft; and interrupting the rotation of the output shaft when the detected tightening torque reaches a preset switching torque immediately before the fastener is seated on a surface. Thereafter, the output shaft is rotated with a medium torque relative to the lower, predetermined torque and at a medium speed relative to the higher, predetermined speed followed by; interrupting the rotation of the output shaft when the detected tightening torque reaches a preset snug torque when the fastener is seated on the surface. Finally, the output shaft is rotated with a higher torque relative to the lower, predetermined torque and at a lower speed relative to the higher, predetermined speed; and the rotation of the output shaft is stopped when the detected tightening torque reaches a preset final torque when the fastener is completely tightened. The lower, medium and higher torque, identified above and subsequently, may also be described as a first, second and third torque, respectively. Similarly, the higher, medium and lower speed, identified above and subsequently, may be described as a first, second and third speed, respectively.

The method further includes the step of removing the tightening torque from the output shaft when interrupting the rotation of the output shaft immediately before the fastener is seated on the surface and also when interrupting the rotation of the output shaft when the fastener is seated on the surface.

The method further includes the step of reversing the rotation of the output shaft to brake the output shaft to remove the tightening torque from the output shaft.

The snug torque is about 20% of the final torque and the switching torque is about 70% of the snug torque.

The higher speed ranges from 600 rpm to 800 rpm, the medium speed ranges from 100 rpm to 200 rpm, and the lower speed ranges from 10 rpm to 30 rpm.

According to the present invention, there is also provided an apparatus for controlling a nut runner for tightening a fastener, including a motor for rotating an output shaft of the nut runner, a speed reducer including a switching clutch shiftable selectively in higher and lower speed positions for rotating the output shaft in respective higher and lower speed ranges and a torque sensor for detecting a tightening torque of the output shaft. A master controller includes means for presetting a switching torque, a snug torque, a final torque, a higher speed, a medium speed, and a lower speed. A subcontroller includes comparator means for determining whether the detected tightening torque reaches each of the preset switching, snug, and final torques, switching means responsive to a signal from the comparator means for rotating the output shaft with a lower torque at the higher speed with the switching clutch in the higher speed position, interrupting the rotation of the output shaft and shifting the switching clutch into the lower speed position when the detected tightening torque reaches the preset switching torque. Thereafter, the output shaft is rotated with a medium torque at the medium speed, and interrupts the rotation of the output shaft when the detected tightening torque reaches the preset snug torque. Finally, the output shaft is rotated with a higher torque at the lower speed, and stop the rotation of the output shaft when the detected tightening torque reaches the preset final torque. Motor driver means responsive to an output signal from the switching means as provided for controlling the motor and the output shaft through the speed reducer.

With the method of the present invention, the switching torque, the snug torque, and the final torque are preset. The output shaft of the nut runner is first rotated with the lower torque at the higher speed. The tightening torque of the output shaft is detected and compared with the switching torque. When the tightening torque reaches the switching torque, the lower-torque higher-speed rotation of the output shaft is interrupted, and thereafter the output shaft is rotated with the medium torque at the medium speed. When the tightening torque reaches the snug torque, the medium-torque medium-speed rotation of the output shaft is interrupted, and thereafter the output shaft is rotated with the higher torque at the higher speed. When the tightening torque reaches the final torque, the higher-torque lower-speed rotation of the output shaft is stopped thus completing the tightening of the fastener.

Each time the rotational speed of the output shaft is to be changed, the rotation of the output shaft is interrupted to prevent inertial forces of the output shaft from adversely affecting the tightening of the fastener.

Each time the rotational speed of the output shaft is to be changed, the tightening torque is removed from the output shaft to relatively reduce an increase in the tightening torque from the time immediately before the fastener is seated to the time when the fastener is seated, thereby facilitating the control of the position in which the output shaft is stalled.

The snug torque is about 20% of the final torque and said switching torque is about 70% of the snug torque, and the higher speed ranges from 600 rpm to 800 rpm, the medium speed ranges from 100 rpm to 200 rpm, and the lower speed ranges from 10 rpm to 30 rpm. With these numerical settings, the time period required for tightening the fastener is shortened, and the final tightening torque is of a desired torque level.

With the control method of the present invention, the master controller is preset to the switching torque, the snug torque, the final torque, the higher speed, the medium speed, and the lower speed. The output shaft is rotated with the lower torque at the higher speed by the motor through the speed reducer with the switching clutch in the higher speed position. The tightening torque detected by the torque sensor is compared with the switching torque by the comparator means. When the tightening torque reaches the switching torque, the rotation of the output shaft is interrupted by the switching means through the motor driver means, and the switching clutch is shifted into the lower speed position. Thereafter, the output shaft is rotated with the medium torque at the medium speed by the motor through the speed reducer. When the tightening torque reaches the snug torque, the rotation of the output shaft is interrupted by the switching means through the motor driver means. Thereafter the output shaft is rotated with the higher torque at the lower speed by the motor through the speed reducer. When the tightening torque reaches the final torque, the rotation of the output shaft is stopped by the switching means through the motor driver means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE EMBODIMENT

Figure 1:
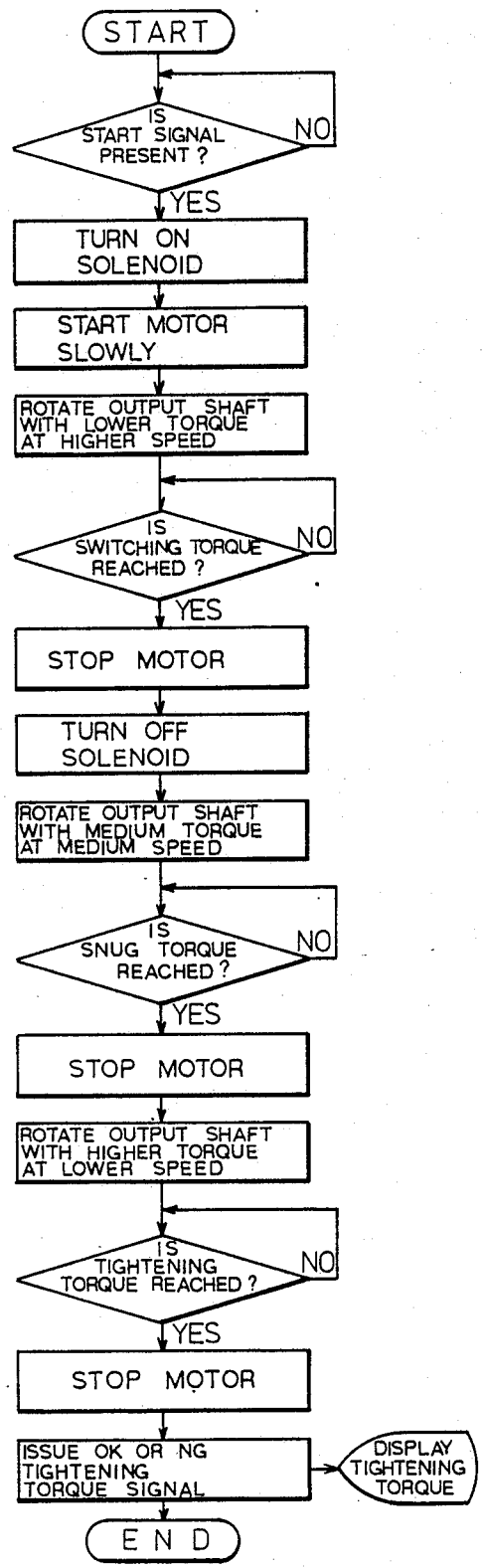
FIG. 1 is a flowchart of a control sequence of a nut runner control method according to the present invention.
Figure 2:
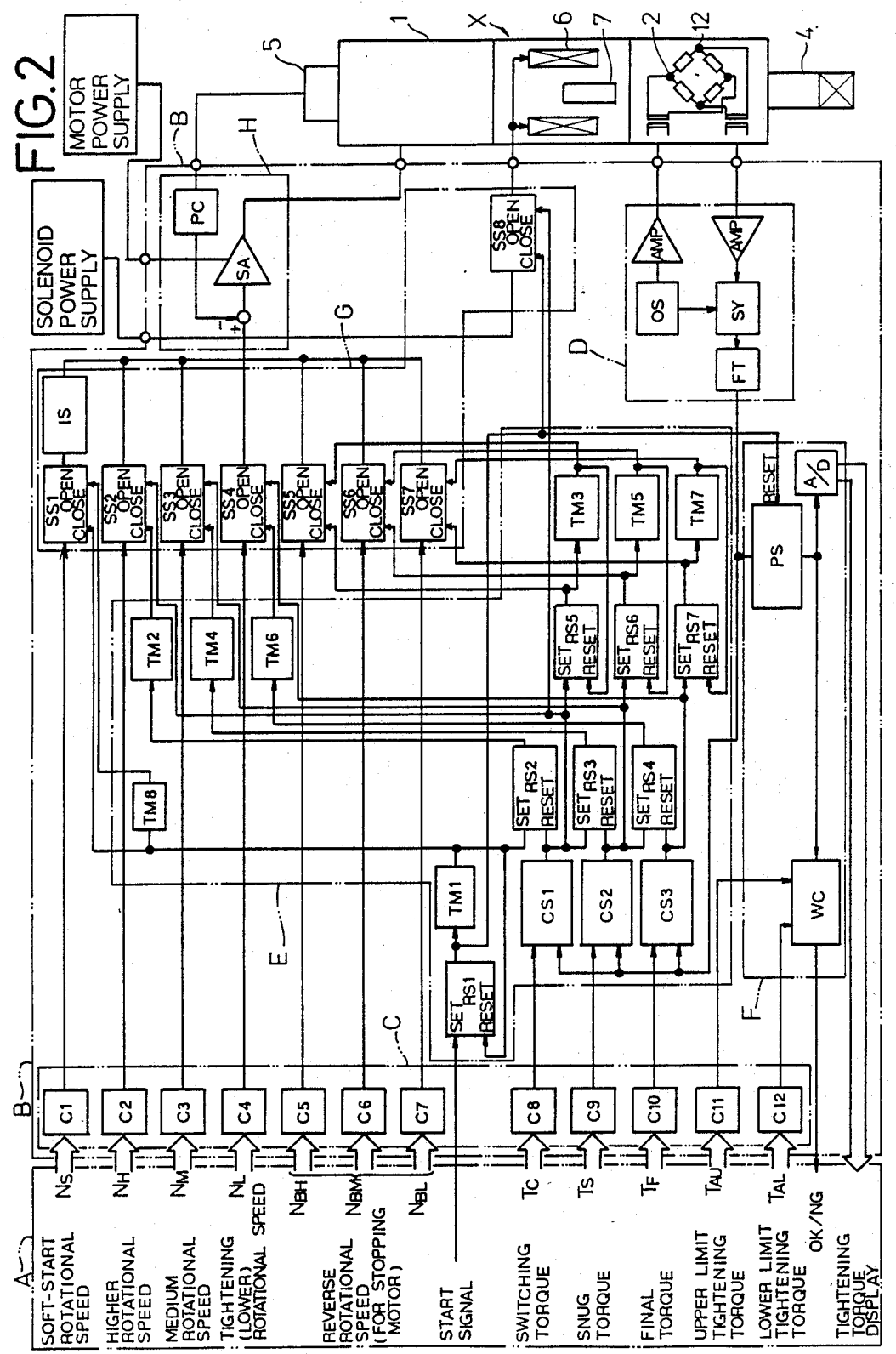
FIG. 2 is a block diagram of a nut runner control apparatus according to the present invention.
Figure 4:
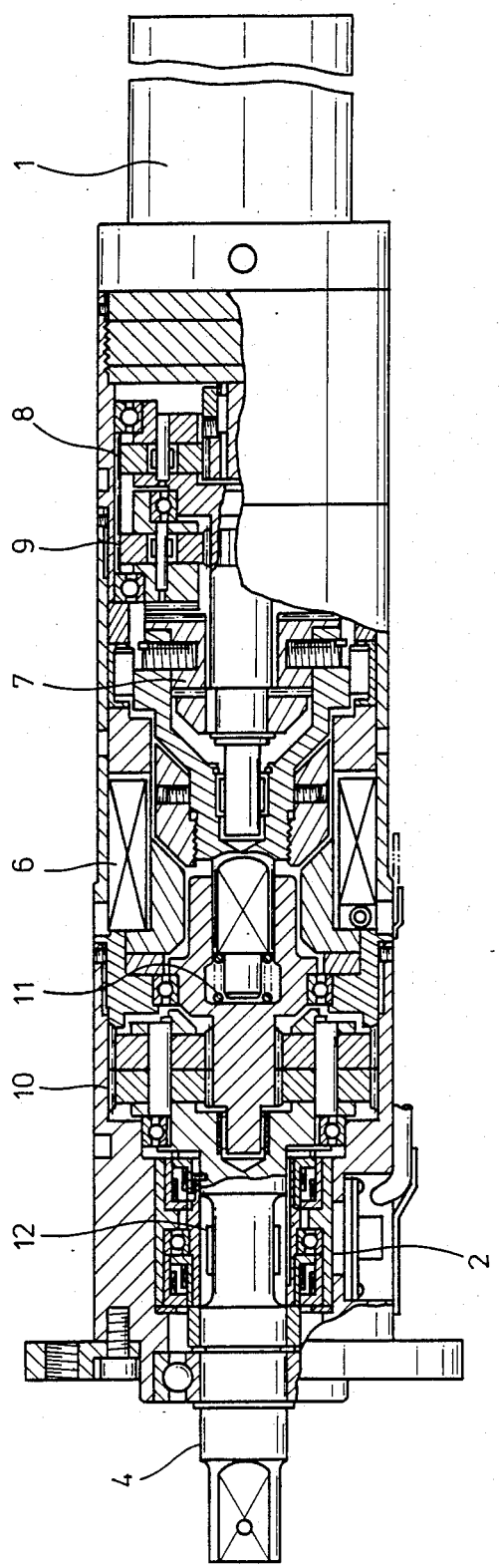
FIG. 4 is a cross-sectional view of a nut runner controlled by the method and the apparatus of the present invention.

A nut runner X shown in FIG. 4 is controlled by a nut runner control apparatus shown in FIG. 2 in accordance with a nut runner control method shown in FIG. 1.

As shown in FIG. 2, the control apparatus includes a master controller A and a subcontroller B coupled thereto for controlling the nut runner X electrically connected to the subcontroller B to tighten a fastener such as a bolt, a nut, or the like.

The master controller A is set to a slow-start rotational speed $N_S$, a higher, predetermined rotational speed $N_H$, a medium rotational speed $N_M$, and a lower rotational speed $N_L$ for controlling the rotational speed of a motor 1 of the nut runner X, reverse rotational speeds $N_{BH}$, $N_{BM}$, $N_{BL}$ corresponding to the rotational speeds $N_H$, $N_M$, $N_L$, respectively, for braking or stopping the rotation of the motor 1, a switching torque $T_C$, a snug torque $T_S$, and a final torque $T_F$ for selecting the rotational speeds or shutting off the motor 1, and an upper limit tightening torque $T_{AU}$ and a lower limit tightening torque $T_{AL}$ for determining whether the final torque $T_F$ is appropriate or not when the tightening of the fastener is completed. The master controller A also displays a tightening torque $T_O$ of an output shaft 4 of the nut runner X.

The subcontroller B comprises a D/A converter means C for converting the various preset digital signals from the master controller A into corresponding analog signals. A detector means D is connected to a torque sensor 2 of the nut runner X for applying a signal to and receiving a signal from the torque sensor 2 to detect the tightening torque $T_O$. A comparator means E is provided for comparing the detected tightening torque $T_O$ with the preset torques $T_C$, $T_S$, $T_F$. A decision means F is provided for determining whether the final torque $T_F$ is appropriate or not. A switching means G is responsive to output signals from the comparator E for sequentially switching circuits for the preset rotational speeds $N_S$, $N_H$, $N_M$, $N_L$ and operating a switching clutch 7 of a speed reducer of the nut runner X. A motor driver means H having a servoamplifier SA responsive to an output signal from the switching unit G is provided for driving the motor 1 to rotate the nut runner X selectively with a lower torque at a higher speed, with a medium torque at a medium speed, and with a higher torque at a lower speed.

The comparator means E comprises comparators CS1, CS2, CS3 for comparing analog voltages converted respectively from digital input signals representing the preset torques $T_C$, $T_S$, $T_F$ by D/A converters C8, C9, C10 of the D/A converter means C with the measured tightening torque $T_O$ to determine whether the measured tightening torque $T_O$ has reached the switching torque $T_C$, the snug torque $T_S$, and the final torque $T_F$, respectively, latches RS1 through RS7 for switching the comparators CS1, CS2, CS3, and delay circuits TM1 through TM7 for delaying operation times.

The switching means G comprises switching circuits SS1 through SS7 for applying, to the servoamplifier SA, analog voltages converted respectively from digital input signals representing the preset rotational speeds $N_S$, $N_H$, $N_M$, $N_L$, $N_{BH}$, $N_{BM}$, $N_{BL}$ by D/A Converters C1 through C7 of the D/A converter means C, a switching circuit SS8 responsive to an output signal from the comparator CS1 for applying an output signal to a solenoid 6 of the nut runner X to operate the switching clutch of the nut runner X, and an integrating circuit IS for starting the nut runner X slowly.

The nut runner X shown in FIG. 4 is driven by the motor 1 which has a pulse transmitter 5 (FIG. 2). The torque sensor 2 having strain gages 12 is associated with the output shaft 4 for issuing a signal indicative of the detected tightening torque $T_O$ to the detector means D.

When the solenoid 6 is energized, it moves the switching clutch 7 into a higher-speed position against the resiliency of a spring 11 to rotate the output shaft 4 with a lower torque at a higher speed through first and third planetary gear mechanisms 8, 10 of the speed reducer. When the solenoid 6 is de-energized, it allows the switching clutch 7 to be shifted into a lower-speed position under the bias of the spring 11 for rotating the output shaft 4 through the first, second, and third planetary gear mechanisms 8, 9, 10 of the speed reducer.

Operation of the control apparatus for tightening a fastener with the nut runner X will be described below with reference to FIGS. 1, 2, and 4.

A start signal is applied from the master controller A to the latch RS1 to set the same to close the switching circuit SS8 for energizing the solenoid 6 of the nut runner X. The switching clutch 7 of the nut runner X is shifted into the higher-speed position to ready the nut runner X for low-torque high-speed operation in a two-stage speed reduction mode achieved by the first and third speed planetary gear mechanisms 8, 10.

After the switching clutch 7 has been shifted, the delay circuit TM closes the switching circuit SS1 to reset the latch RS1 and to set the latch RS2. When the switching circuit SS1 is closed, the digital signal representing the preset slow-start rotational speed $N_S$ is converted into an analog voltage signal by the D/A converter C1, and the analog voltage is issued via the integrating circuit IS to the servoamplifier SA, which employs the applied voltage as a rotation control voltage to control the voltage from a motor power supply through a feedback control loop for smoothly and slowly starting to energize the motor 1. Then, upon elapse of a slow-start time, the delay circuit TM8 opens the switching circuit SS1 to stop the slow-start rotation of the motor 1. An output signal from the latch RS2 is applied to the delay circuit TM2 which closes the switching circuit SS2 at the same time that the slow-start rotation of the motor 1 is stopped. An analog voltage converted from the digital signal representing the higher rotational speed $N_H$ by the D/A converter C2 is applied through the switching circuit SS2 to the servoamplifier SA, which controls the voltage applied to the motor 1 to rotate the motor 1 with a lower torque at a higher speed.

The output shaft 4 which is rotated by the motor with the lower torque at the higher speed generates the tightening torque $T_O$ for tightening the fastener. The generated tightening torque $T_O$ is detected by the torque sensor 2 coupled to the output shaft 4, and its signal is applied to the detector means D of the subcontroller B. The detector means D applies a carrier voltage from an oscillator OS through an amplifier AMP to the strain gages 12 of the torque sensor 2. The strain gages 12 are connected as a Wheatstone bridge which is kept in equilibrium unless the tightening torque $T_O$ is produced by the output shaft 4. When the tightening torque $T_O$ is generated by the output shaft 4, the Wheatstone bridge is brought out of equilibrium and detects the strain on the output shaft 4. A signal representing the strain is applied from the torque sensor 2 to a synchronous detector SY through an amplifier AMP. The carrier of an output signal from the synchronous detector SY is cut off by a filter FT. The detector means D now produces a voltage signal representing the tightening torque $T_O$. The detector means D applies the tightening torque voltage to the comparator means E. The tightening torque voltage from the detector means D is applied to the comparator CS1 for comparison with the analog voltage converted from the digital switching torque $T_C$.

When the tightening torque $T_O$ reaches the switching torque $T_C$, the latch circuit RS2 is reset and the switching circuit SS2 is opened, and the latch circuit RS5 is set and the switching circuit SS5 is closed. At this time, an inverted voltage of the reverse rotational speed $N_{BH}$ is applied via the switching circuit SS5 to the servoamplifier SA to forcibly reversing the motor 1 to quickly brake or stop the rotation of the motor 1. The period of time for which the switching circuit SS5 is closed, i.e., the rotation of the motor 1 is stopped, is preset in the delay circuit TM3. After elapse of this period of time, the switching circuit SS5 is opened and the latch circuit RS5 is reset. The output signal from the comparator CS1 is also applied to open the switching circuit SS8 to de-energize the solenoid 6 of the nut runner X, retracting the speed reducer of the switching clutch 7 from the higher-speed position.

Since the switching clutch 7 is urged toward the lower-speed position by the spring 11, the switching clutch 7 is automatically shifted into the lower-speed position, and now the output shaft 4 can be rotated with a medium torque at a medium speed or with a higher torque at a lower speed in a three-stage speed reduction mode achieved by the first through three planetary gear mechanisms 8, 9, 10.

The output signal from the comparator CS1 is also supplied to set the latch RS3 to energize the delay circuit TM4. After elapse of the shutdown time of the motor 1, the delay circuit TM4 closes the switching circuit SS3 to allow the analog voltage representing the medium rotational speed $N_M$ from the D/A converter C3 to be applied via the switching circuit SS3 to the servoamplifier SA. The servoamplifier SA then controls the voltage applied to the motor 1 to rotate the output shaft 4 with the medium torque at the medium speed.

When the tightening torque $T_O$ detected by the torque sensor 2 reaches the snug torque $T_S$, a signal indicative of the tightening torque $T_O$ is supplied from the detector means D and issued from the comparator CS2. The output signal from the comparator CS2 resets the latch RS3 and opens the switching circuit SS3, and at the same time sets the latch RS6 and closes the switching circuit SS6. The medium-torque medium-speed rotation of the motor 1 is now discontinued, and upon elapse of a preset period of time, the switching circuit SS6 is opened by the delay circuit TM5 and the latch RS6 is reset.

At this time, the output signal from the comparator CS2 sets the latch RS4 and is applied to the delay circuit TM6. After the motor 1 is shut off for the preset period of time, the delay circuit TM6 closes the switching circuit SS4 to enable the motor 1 to rotate the output shaft 4 with the higher torque at the lower speed.

The tightening torque $T_O$ is increased by the higher-torque lower-speed rotation of the output shaft 4. When the tightening torque $T_O$ reaches the final torque $T_F$, a signal indicating the tightening torque $T_O$ is supplied from the detector means D and issued from the comparator CS3 to reset the latch RS4 and opens the switching circuit SS4. Simultaneously, the latch RS7 is set and the switching circuit SS7 is closed to discontinue the higher-torque lower-speed rotation of the output shaft 4.

In order not to reverse the motor 1, the switching circuit SS7 is opened and the latch RS 7 is reset by the delay circuit TM upon elapse of a preset period of time.

The maximum level of the tightening torque $T_O$ detected by the torque sensor 2 is held by a peak hold circuit PS of the decision means F. The analog voltage indicative of the maximum tightening torque level is converted by an A/D converter into a digital voltage which is then displayed as a digital value on a tightening torque display (not shown) in the master controller A. The peak hold circuit PS is initially reset by the start signal applied thereto through the latch RS1. The output signal from the peak hold circuit PS is also applied to a window comparator WC which compares the maximum tightening torque level with the upper limit tightening torque $T_{AU}$ and the lower limit tightening torque $T_{AL}$ which are supplied from the master controller A. If the maximum tightening torque falls between the upper and lower limit tightening torques $T_{AU}$, $T_{AL}$, then the window comparator WC applies an OK signal to the master controller A. If the maximum tightening torque falls outside the range between the upper and lower limit tightening torques $T_{AU}$, $T_{AL}$, then the window comparator WC applies an NG signal to the master controller A. The decision means F thus determines whether the tightening torque is appropriate or not.

A pulsed output signal from the pulse transmitter 5 associated with the motor 1 is converted into a voltage by a pulse-to-voltage converter PC. The voltage is fed back to the servoamplifier SA for controlling the rotation control voltage from the switching means G to energize the motor at a selected one of the rotational speeds and produce a selected one of the torques.

In order to set the final torque $T_F$ to an appropriate torque level, performing a tightening procedure efficiently, and prevent excessive tightening of the fastener, the fastener is tightened with a lower, predetermined torque at a higher, predetermined speed immediately before the fastener is seated on a surface since the tightening torque is not large, and when the tightening torque reaches the preset switching torque $T_C$, the nut runner output shaft is temporarily stopped. Then, the fastener is tightened again with a medium torque at a medium speed so that it is seated with the medium torque relative to the lower, predetermined torque and at the medium speed relative to the higher, predetermined speed. When the tightening torque reaches the preset snug torque $T_S$, the nut runner output shaft is stopped again, after which the fastener is tightened again with a higher torque relative to the lower, predetermined torque and at a higher speed relative to the higher, predetermined speed until the tightening torque reaches the final torque $T_F$. The tightening time and the tightening condition are good by selecting the snug torque $T_S$ to be about 20% of the final torque $T_F$ and also selecting the preset switching torque $T_C$ to be about 70% of the preset snug torque $T_S$.

Figure 3:
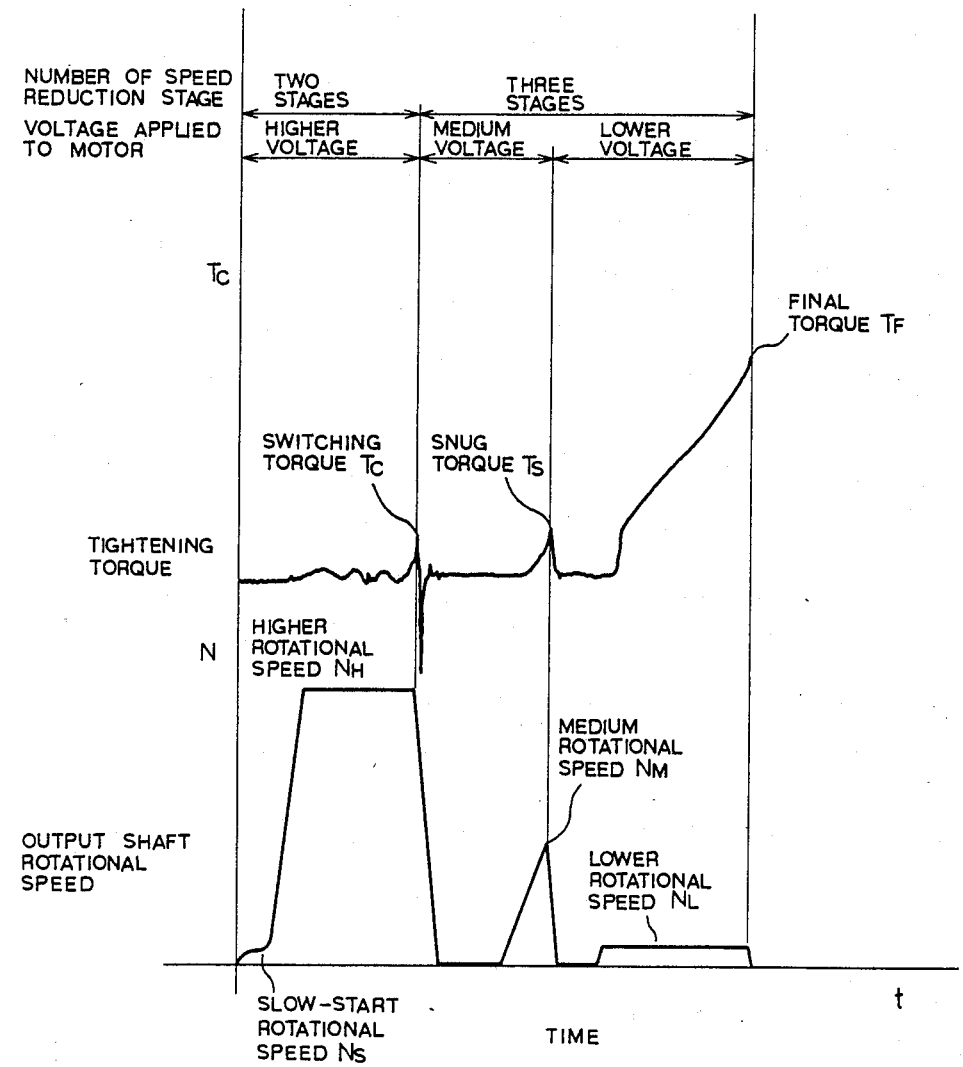
FIG. 3 is a diagram showing a time vs. tightening torque curve and a time vs. rotational speed curve.

FIG. 3 shows a graph having a horizontal axis representing time and a vertical axis representing the detected tightening torque. An upper t-$T_O$ curve indicates how the tightening torque $T_O$ varies with time, and a lower t-N curve shows the manner in which the rotational speed N of the output shaft 4 varies with time.

The t-$T_O$ curve is plotted when the snug torque $T_S$ is 20% of the final torque $T_F$ and the switching torque $T_C$ is 70% of the snug torque $T_S$. With the illustrated t-$T_O$ curve, the fastener such as a bolt is tightened in a high speed range from 600 rpm to 800 rpm, preferably from 700 rpm to 800 rpm, and then abruptly stopped by applying an inverted voltage to the motor at the preset switching torque $T_C$ immediately before the fastener is seated. Therefore, the tightening torque is stable just before the fastener is seated. Then, the fastener is tightened in a medium speed range from 100 to 200 rpm, and the tightening torque is increased up to the preset snug torque $T_S$ which is reached in the fastener seated condition. The motor 1 energized again to rotate the output shaft 4 in a low speed range from 10 to 30 rpm to tighten the fastener, which is abruptly stopped when the preset final torque $T_F$ is reached. Since no response delay is experienced and the fastener is tightened from the stopped position, the tightening torque $T_O$, i.e., the final torque $T_F$, is made substantially constant, and hence the tightening procedure can easily be supervised. With the medium rotational speed being set, the higher rotational speed can be increased from conventional 300 rpm to a speed ranging from 600 rpm to 800 rpm, so that the total tightening time can be shortened. While the final torque $T_F$ varies with the material of the fastener to be tightened, dependent on whether a washer is employed or not, with the pitch of the screw threads of the fastener, the condition of a surface on which the fastener is to be seated, and various other factors, the values to which the master controller A is to be set can easily be varied by way of digital input signals. By modifying the preset values, the tightening procedure can easily be supervised and the fastener can be tightened with high accuracy.

The control apparatus shown in FIG. 2 is shown as being of a sequence control arrangement, but may comprise a microprocessor so that the control process can be programmed by software.

With the present invention, as described above, the tightening torque of the output shaft 4 is detected, and when the detected tightening torque reaches preset torque levels, the rotation of the output shaft 4 is interrupted. The torque and rotational speed of the output shaft 4 are switched between three torques and three rotational speeds, i.e., a lower torque and a higher speed, a medium torque and a medium speed, and a higher torque and a lower speed. Therefore, a response delay in switching the rotational speeds and adverse effects of an inertial force of the output shaft can be eliminated. Since the higher rotational speed may be further increased, therefore, the time required for tightening the fastener can be reduced.

Although a certain preferred embodiment has been shown and described, it should be understood that many changes and modifications may be made therein without departing from the scope of the appended claims.

What is claimed is:

1. A method of controlling a nut runner for tightening a fastener, comprising the steps of:
    rotating an output shaft of the nut runner with a predetermined first torque at a predetermined first speed;
    detecting said predetermined first torque of said output shaft;
    interrupting the rotating of said output shaft when said predetermined first torque reaches a preset switching torque immediately before said fastener is seated on a surface;
    thereafter, rotating said output shaft with a second torque, said second torque being greater than said predetermined first torque, and at a second speed, said second speed being slower than said predetermined first speed;
    interrupting the rotation of said output shaft when said second torque reaches a preset snug torque when said fastener is seated on the surface;
    thereafter, rotating said output shaft with a third torque, said third torque being greater than said predetermined first torque and said second torque, and at a third speed, said third speed being slower than said predetermined first speed and said second speed; and
    stopping the rotating of said output shaft when said third torque reaches a preset final torque when said fastener is completely tightened.

2. The method according to claim 1, further including the step of:
    removing torque from said output shaft when interrupting the rotation of said output shaft immediately before said fastener is seated on the surface and also when interrupting the rotation of said output shaft when said fastener is seated on the surface.

3. The method according to claim 2, further including the step of:
    reversing the rotation of said output shaft, thereby braking the output shaft, and thereby removing torque from said output shaft.

4. The method according to claim 1, wherein said snug torque is about 20% of said final torque and said switching torque is about 70% of said snug torque.

5. The method according to claim 1, wherein said predetermined first speed ranges from 600 rpm to 800 rpm, said second speed ranges from 100 rpm to 200 rpm, and said third speed ranges from 10 rpm to 30 rpm.

* * * * *